United States Patent Office 3,140,307
Patented July 7, 1964

3,140,307
TOXIC ARYLSULFONYL HALOALKANENITRILES
Samuel Allen Heininger, Warson Woods, Mo., and Gail H. Birum, Dayton, Ohio, assignors to Monsanto Company, a corporation of Delaware
No Drawing. Filed Mar. 3, 1959, Ser. No. 796,740
10 Claims. (Cl. 260—465)

This invention relates to toxic arylsulfonyl haloalkanenitriles and more particularly to methods for the control of microorganisms using these nitriles and certain novel compositions comprising these nitriles which are highly toxic to microorganisms such as bacteria and fungi. This application is a continuation-in-part of an application Serial No. 656,199, filed May 1, 1957, now abandoned.

The novel compounds of the invention are arylsulfonyl haloalkanenitriles of the formula

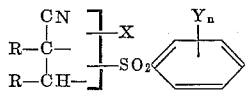

wherein R is selected from the class consisting of hydrogen and hydrocarbon radicals free of aliphatic unsaturation containing from 1 to 6 carbon atoms, provided at least one R is hydrogen. X represents a halogen atom taken from the class consisting of chlorine and bromine. Y is selected from the class consisting of chlorine, bromine, iodine, fluorine, hydrogen and alkyl radicals having from 1 to 6 carbon atoms, and $n$ is an integer of from 1 to 5.

It is an object of this invention to provide new compounds.

It is another object of this invention to provide new and effective biological toxicant compositions.

It is another object of this invention to provide a new method of inhibiting the growth of undesired microorganisms.

It is another object of this invention to provide new soil compositions which inhibit the growth of fungi.

It is another object of this invention to provide a new method of treating soil to kill or inhibit the growth of fungi.

It is another object of this invention to provide a new method of treating soil to prevent substantial fungal damage to the germination of seeds and the growth of plants in the soil.

These and other objects of the invention will become apparent as the detailed description of the invention proceeds.

There are shown below a number of the specific new compounds of the invention. It is not intended that this be a complete listing of all the compounds of the invention, but that it merely be illustrative thereof. The following are a listing of a number of the arylsulfonyl chloroalkanenitriles:

3-(phenylsulfonyl)-2-chloropropionitrile,
2-(phenylsulfonyl)-3-chloropropionitrile,
3-(2-chlorophenylsulfonyl)-2-chloropropionitrile,
3-(3-chlorophenylsulfonyl)-2-chloropropionitrile,
3-(4-chlorophenylsulfonyl)-2-chloropropionitrile,
2-(2-chlorophenylsulfonyl)-3-chloropropionitrile,
2-(3-chlorophenylsulfonyl)-3-chloropropionitrile,
2-(4-chlorophenylsulfonyl)-3-chloropropionitrile,
3-(2,4-dichlorophenylsulfonyl)-2-chloropropionitrile,
2-(2,4-dichlorophenylsulfonyl)-3-chloropropionitrile;
3-(pentachlorophenylsulfonyl)-2-chloropropionitrile,
2-(pentachlorophenylsulfonyl)-3-chloropropionitrile, etc.

An examination of the above-listed compounds only as to the nuclear substitution indicates that not every one of the possible novel compounds of the invention is named specifically. For example, only one of the dichloroisomers is named, no trichloro- and no tetrachloro compounds are named. Nevertheless, it is intended to cover all these compounds as well as others covered by the general formula but not specifically named.

Of the chlorophenylsulfonyl chloropropionitriles named specifically above the preferred compounds are those of the following general formula:

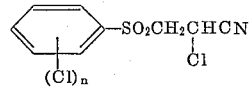

where $n$ is an integer from 1 to 5 inclusive. These compounds are preferred for a number of reasons such as that they can be produced in exceptional high yield economically and have high biological toxicity. The compounds having the sulfonyl group attached in the 2 rather than the 3 position on the propionitrile are of course also active biological toxicants.

The following is a non-limiting listing of a number of the new arylsulfonyl bromoalkanenitriles:

3-(phenylsulfonyl)-2-bromopropionitrile,
2-(phenylsulfonyl)-3-bromopropionitrile,
3-(2-bromophenylsulfonyl)-2-bromopropionitrile,
3-(3-bromophenylsulfonyl)-2-bromopropionitrile,
3-(4-bromophenylsulfonyl)-2-bromopropionitrile,
2-(2-bromophenylsulfonyl)-3-bromopropionitrile,
2-(3-bromophenylsulfonyl)-3-bromopropionitrile,
2-(4-bromophenylsulfonyl)-3-bromopropionitrile;
3-(2,4-dibromophenylsulfonyl)-2-bromopropionitrile,
2-(2,4-dibromophenylsulfonyl)-3-bromopropionitrile;
3-(pentabromophenylsulfonyl)-2-bromopropionitrile,
2-(pentabromophenylsulfonyl)-3-bromopropionitrile, etc.

It is also intended to cover bromo- or chlorophenylsulfonyl chloro- or bromopropionitriles and the following are a non-limiting list thereof:

2-(4-bromophenylsulfonyl)-3-chloropropionitrile,
3-(2-chlorophenylsulfonyl)-2-bromopropionitrile,
3-(2-bromo-4-chlorophenylsulfonyl)-2-bromopropionitrile,
2-(2,4-dibromo-3-chlorophenylsulfonyl)-3-chloropropionitrile,
3-(pentabromophenylsulfonyl)-2-chloropropionitrile, etc.

Some of the novel compounds of the invention of the iodo-phenylsulfonyl halo-propionitrile type are shown in the following non-limiting list:

3-(2-iodophenylsulfonyl)-2-chloropropionitrile,
2-(4-iodophenylsulfonyl)-3-bromopropionitrile,
3-(2,4-diiodophenylsulfonyl)-2-chloropropionitrile,
2-(3,4-diiodophenylsulfonyl)-3-bromopropionitrile,
3-(2,3-diiodophenylsulfonyl)-2-chloropropionitrile,
2-(2-iodo-4-bromophenylsulfonyl)-3-chloropropionitrile, etc.

For a non-limiting listing of the fluorophenylsulfonyl halopropionitriles, the following are named: 3-(4-fluorophenylsulfonyl)-2-bromopropionitrile, 2-(2-fluoro-3-iodo-4-bromophenylsulfonyl)-3-chloropropionitrile, etc.

A limited group of compounds of the invention have especially high activity as soil fungicides. These compounds are the phenylsulfonyl chloropropionitriles and the lower-alkylphenylsulfonyl chloropropionitriles. Of the lower-alkylphenylsulfonyl chloropropionitriles the most active and the most desirable are those in which the lower alkyl substituents are methyl radicals. As indicated in the broad description of the invention the phenyl group can be substituted by from 1 to 5, inclusive, lower alkyl radicals; however, the unsubstituted phenylsulfonyl chloropropionitriles and the tolyl- or xylylsulfonyl chloropropionitriles are the most active as soil fungicides, being active in concentrations as low as 5 p.p.m. or lower. Of these phenylsulfonyl, tolylsulfonyl and xylylsulfonyl chloropropionitriles, the 3-phenylsulfonyl-, 3-(tolylsulfonyl)- and the 3-(xylylsulfonyl)-2-chloropropionitriles are preferred. An illustrative list, not meant to be limiting, of these lower-alkyl-phenylsulfonyl chloropropionitriles of the invention is as follows:

3-(4-tolylsulfonyl)-2-chloropropionitrile,
2-(4-tolylsulfonyl)-3-chloropropionitrile,
3-(2-tolylsulfonyl)-2-chloropropionitrile,
2-(2-tolylsulfonyl)-3-chloropropionitrile,
3-(3-tolylsulfonyl)-2-chloropropionitrile,
2-(3-tolylsulfonyl)-3-chloropropionitrile,
3-(2,3-xylylsulfonyl)-2-chloropropionitrile,
3-(2,4-xylylsulfonyl)-2-chloropropionitrile,
3-(2,5-xylylsulfonyl)-2-chloropropionitrile,
3-(2,6-xylylsulfonyl)-2-chloropropionitrile,
3-(3,4-xylylsulfonyl)-2-chloropropionitrile,
3-(3,5-xylylsulfonyl)-2-chloropropionitrile,
2-(2,3-xylylsulfonyl)-3-chloropropionitrile,
2-(2,4-xylylsulfonyl)-3-chloropropionitrile,
2-(2,5-xylylsulfonyl)-3-chloropropionitrile,
2-(2,6-xylylsulfonyl)-3-chloropropionitrile,
2-(3,4-xylylsulfonyl)-3-chloropropionitrile,
2-(3,5-xylylsulfonyl)-3-chloropropionitrile,
3-(2,3,4-trimethylphenylsulfonyl)-2-chloropropionitrile,
2-(2,3,5,6-tetramethylphenylsulfonyl)-3-chloropropionitrile,
3-(pentamethylphenylsulfonyl)-2-chloropropionitrile,
2-(4-ethylphenylsulfonyl)-3-chloropropionitrile,
3-(3-propylphenylsulfonyl)-2-chloropropionitrile,
2-(2-isopropylphenylsulfonyl)-3-chloropropionitrile,
3-(4-t-butylphenylsulfonyl)-2-chloropropionitrile,
2-(2-amylphenylsulfonyl)-3-chloropropionitrile,
3-(4-hexylphenylsulfonyl)-2-chloropropionitrile, etc.

In addition to the alkylphenylsulfonyl chloropropionitriles, the other alkylphenylsulfonyl halopropionitriles especially the bromo propionitriles are active soil fungicides as well as being otherwise biologically active. A brief illustrative list of these other bromopropionitriles is as follows: 3-(4-tolylsulfonyl)-2-bromopropionitrile, 2-(3,5-diethylphenylsulfonyl)-3-bromopropionitrile, etc.

Also mixed alkyl and halophenylsulfonyl halopropionitriles such as: 2-(2-methyl-4-chlorophenylsulfonyl)-3-bromopropionitrile, 3-(2,4-dichloro-5-ethylphenylsulfonyl)-2-bromopropionitrile, etc., will be active biological toxicants.

Referring now to the general formula above of the inventive compounds, some compounds are shown where R is other than hydrogen to give a non-limiting list as follows: 2-(2-iodophenylsulfonyl)-2-methyl-3-chloropropionitrile, 3-(2,4-dimethylphenylsulfonyl)-3-phenyl-2-bromopropionitrile, etc.

Other compounds which are not covered by the general formula above but which can be prepared in a similar manner are the naphthylsulfonyl halopropionitriles, e.g., 2-($\beta$-naphthylsulfonyl)-3-bromopropionitrile, 3-($\beta$-bromo-$\alpha$-naphthylsulfonyl)-2-chloropropionitrile, and similar compounds.

The novel compounds of the invention are prepared by the controlled oxidation of the corresponding sulfide, using $KMnO_4$, $CrO_3$, $H_2O_2$ in acetic acid, or similar oxidizing agents. These sulfides may be readily prepared by a variety of methods including addition of alkyl- or haloarenesulfenyl chlorides or bromides to acrylonitrile to give mixtures of 3-(or 2)-halo-2-(or 3)-(substituted phenylthio)propionitriles, addition of alkyl- or halosubstituted thiophenols to $\alpha$-haloacrylonitriles to give 2-halo-3-(substituted phenylthio)propionitriles, addition of a hydrogen halide to the olefinic unsaturation of a 2- or 3-(substituted phenylthio)acrylonitrile, reaction of a 2,3-dihalopropionitrile with an alkali metal salt of a substituted thiophenol, and by other methods obvious to those skilled in the art. The preparation of such sulfides by several of the above detailed methods and their oxidation to sulfones of the type disclosed herein will be illustrated by the specific examples shown below.

EXAMPLE 1

This example illustrates the preparation of 3-(4-chlorophenylsulfonyl)-2-chloropropionitrile.

The sulfide is made in the following manner: To a solution of 43.3 g. (0.3 mole) of p-chlorothiophenol in 75 ml. of dioxane containing 5 ml. of 50% aqueous choline (2-hydroxyethyltrimethylammonium hydroxide) was added 26.3 g. (0.3 mole) of $\alpha$-chloroacrylonitrile. There was an immediate exothermal reaction during the addition, and the reaction mixture temperature was held at 35–40° C. by cooling. After addition was complete, the reaction mixture was stirred for one-half hour at 30–40° C., and then poured into ice water. The oil which separated was extracted with ether, dried, and the ether removed by evaporation. On distillation, there were collected 55 g. (79% yield) of 3-(4-chlorophenylthio)-2-chloropropionitrile, as a yellow liquid, B. 147–148° C./0.6 mm., $n_D^{25}$ 1.5885, analyzing correctly for $C_9H_7Cl_2NS$ and having an $\alpha$-chloro structure by infrared analysis. On standing, the oil solidified; a sample recrystallized from ethanol had M.P. 39–40° C.

In a beaker was placed 5.8 g. (0.025 mole) of the 3-(4-chlorophenylthio)-2-chloropropionitrile prepared above. To it was added 20 ml. of glacial acetic acid and the mixture was heated until solution was obtained. Then at 50° C. addition was begun of 11.3 g. of 30% $H_2O_2$. There did not appear to be any visible reaction, i.e., it did not appear to be exothermic, but after about two-thirds of the hydrogen peroxide was in, material began to oil out of the reaction mixture. Another 20 ml. of acetic acid was added giving solution again and the addition of the hydrogen peroxide was completed at 50–60° C. The reaction mixture was kept at 50–60° C. for one-half hour after the end of the hydrogen peroxide addition, then the reaction mixture was warmed further to 90° C. at which time a color began to develop. The reaction mixture was then poured into ice water and allowed to stand overnight with the result that a white solid precipitated therefrom.

A portion of the white solid from above was dissolved in 75 ml. of glacial acetic acid and 15 ml. of 30% $H_2O_2$ was added at 50–60° C. to insure completed oxidation to the desired sulfone. The reaction mixture was kept on a hot plate at 50–60° C. for one hour after the completion of the $H_2O_2$ addition and then poured into ice water. The white solid precipitate resulting was recrystallized once from ethyl alcohol-water giving white needles, M.P. 92–93° C. The 92–93° C. M.P. product was submitted for elemental analysis with the following results:

|  | Found | Calcd. for $C_9H_7Cl_2NO_2S$ |
|---|---|---|
| Percent: |  |  |
| C | 41.52 | 40.95 |
| H | 2.80 | 2.67 |
| N | 5.21 | 5.3 |
| Cl | 25.7 | 26.8 |
| S | 12.12 | 12.1 |

This product is the previously unknown 3-(4-chlorophenylsulfonyl)-2-chloropropionitrile.

EXAMPLE 2

This is an example of the preparation of 3-(4-chlorophenylsulfonyl)-2-chloropropionitrile using $KMnO_4$ as the oxidizing agent.

A sample of 4.6 g. (0.02 mole) of the 3-(4-chlorophenylthio)-2-chloropropionitrile prepared in Example 1 was dissolved in 200 ml. of glacial acetic acid and the addition of $KMnO_4$ (6 g.) in 600 ml. of water was started. The color of the reaction mixture developed and turned muddy brown. When all the $KMnO_4$ was in, the reaction mixture was allowed to stand for 10–15 minutes; sodium bisulfite was added with stirring until decolorization of the reaction mixture occurred. Ice and water were added to the slightly cloudy, colorless reaction mixture to make up a 1500 ml. solution. A white solid precipitated from the chilled solution and was filtered therefrom and dried. It weighed 4.1 g. (79%), M.P. 91–92° C. This solid was recrystallized from ethanol-water solution giving 3.9 g. of white needles, M.P. 92–93° C. This is the same as the melting point of the sulfone obtained by hydrogen peroxide oxidation in Example 1.

EXAMPLE 3

This example illustrates the preparation of 2-methyl-2-(p-methylphenylsulfonyl)-3-chloropropionitrile.

A sample of 13.4 g. (0.2 mole) of methacrylonitrile (2-methylacrylonitrile) was placed in a flask and 100 ml. of glacial acetic acid was added. Then 31.7 g. (0.2 mole) of p-toluenesulfenyl chloride was added to the flask. No reaction was apparent, so the contents of the flask were slowly warmed to 70° C. and a gradual lightening of the color of the reaction mixture occurred over a period of 30 minutes to give a product having a clear bright yellow color. The original reaction mixture before heating was a deep red. Acetic acid was stripped off under reduced pressure and then the distillation of the product began. After collecting a small amount of orange forerun there was distilled 30.5 g. (67.7%) of a bright yellow liquid, B.P. 122–125° C./0.2 mm., $n_D^{25}$ 1.5581.

The infrared spectrum of this product shows a medium intensity nitrile single band and no doublet. This suggests only a single isomer resulting from addition of the sulfenyl chloride to the olefinic double bond of methacrylonitrile and no conjugated unsaturated product present. An elemental analysis of the product gave the following information:

|  | Found | Calcd. for $C_{11}H_{12}ClNS$ |
| --- | --- | --- |
| Percent: |  |  |
| C | 58.82 | 58.6 |
| H | 5.69 | 5.36 |
| Cl | 16.06 | 15.75 |
| N | 5.94 | 6.22 |
| S | 14.45 | 14.2 |

The two possible isomers which may be formed from the addition of p-toluenesulfenyl chloride to methacrylonitrile are: I, 2-methyl-3-(p-methylphenylthio)-2-chloropropionitrile; and II, 2-methyl-2-(p-methylphenylthio)-3-chloropropionitrile. Product I has an alpha chlorine atom and its infrared spectrum should not show the nitrile band which the adduct actually produced does show. Also, product I should dehydrochlorinate readily whereas product II cannot dehydrochlorinate. Since no unsaturation was present in the adduct prepared, as indicated by the infrared analysis, and since the nitrile band is relatively strong, it appears that this adduct is the single isomer II. This is also in agreement with what would be expected as a result of steric and electronic considerations.

In an additional experiment to prove the particular sulfide structure, 1.0 g. of the sulfide of this example was placed in a beaker, dissolved in ethyl ether, and 2 ml. of triethylamine was added. No reaction occurred and no precipitate formed. The reaction mixture was heated on a steam bath and still no amine hydrochloride formed. Further heating was continued until all the ethylether was driven off and longer. The residue, when treated again with ethyl ether, gave only a trace of fluffy or flocculent solid. Hence, even at 100° C., no dehydrochlorination has occurred, even with a base present. This experiment supports the structure II as set forth above.

A sample of 4.5 g. (0.02 mole) of the sulfide prepared in this example was placed in a beaker and 40 ml. of glacial acetic acid and 9 ml. of 30% aqueous $H_2O_2$ was added. The clear, colorless solution was heated on a hot plate for one hour at 50–70° C. and then momentarily heated to boiling. Upon pouring the reaction mixture into ice water, a cloudy solution resulted which was allowed to stand overnight, crystallizing into a white solid; the solid was filtered and dried. It weighed 3.3 g. (69.3%), M.P. 83–89° C. The solid was recrystallized from absolute alcohol to give 2.3 g., M.P. 94–95° C., white needles, and a second crop of needles, 0.5 g., M.P. 93–94° C. An infrared analysis of the product sulfone indicated that, although the cyanide band was considerably weaker than in the corresponding sulfide, it was still present, and the elemental analysis of the sulfone was as follows:

|  | Found | Calcd. for $C_{11}H_{12}ClNO_2S$ |
| --- | --- | --- |
| Percent: |  |  |
| C | 51.43 | 51.3 |
| H | 4.26 | 4.7 |
| Cl | 13.67 | 13.8 |
| N | 5.64 | 5.44 |
| S | 12.23 | 12.4 |

This product is the previously unknown 2-methyl-2-(p-methylphenylsulfonyl)-3-chloropropionitrile.

EXAMPLE 4

This is a repeat or check experiment on experiment 3. A sample of 4.5 g. (0.02 mole) of the sulfide made in Example 3 was placed in a beaker with 50 ml. of glacial acetic acid and 11.5 ml. of 30% aqueous $H_2O_2$ was added, i.e., 0.1 mole of $H_2O_2$. The reaction mixture was heated on a hot plate at 70° C. for one hour and poured into water. The solid resulting was filtered from the mixture and 3.8 g. (74%) of a white solid was recovered. This white solid was recrystallized from ethanol giving white needles, M.P. 94–95° C. This is the same melting point product as was obtained in Example 3.

In further proof of the structure of the sulfone, 1.5 g. of the sulfone produced in this example was placed in a beaker and dissolved in 100 ml. of dry ether. To this solution was added 2 ml. of triethylamine. No precipitate was formed and the reaction did not become cloudy on standing two hours, a slight haze had appeared, but this haze did not increase after two days or evaporation nearly to dryness and dilution again with ether. Then, the ether was removed by distillation leaving the white crystals of the sulfone, M.P. 94–95° C.

Thus, it is seen that neither the sulfide nor the sulfone undergoes any dehydrochlorination which further strongly supports the assignment of the structure to this adduct of 2 - methyl-2-(p-methylphenylsulfonyl)-3-chloropropionitrile.

EXAMPLE 5

The following example illustrates the preparation of 3-chloro-2-(4-chlorophenylsulfonyl)propionitrile by hydrochlorination of the corresponding substituted acrylonitrile.

Hydrogen chloride is slowly passed into a solution of 11.3 g. (0.05 mole) of 2-(4-chlorophenylsulfonyl)acrylonitrile (prepared by reaction of formaldehyde with 4-chlorophenylsulfonyl acetonitrile in the presence of piperidine) in 200 ml. of chloroform held at 0° C. in a cooling bath until the theoretical weight increase for uptake of 0.05 mole of hydrogen chloride has been attained. The resulting solution is washed with a dilute aqueous solution of sodium carbonate, then washed with water, dried and the solvent removed by distillation to leave a residue consisting of 3-chloro-2-(4-chlorophenylsulfonyl) propionitrile.

Another method for making the sulfides to be oxidized to produce the novel compounds of the invention is as follows: It was found that the reaction product of acrylonitrile and p-chlorobenzenesulfenyl chloride gave a complex reaction mixture containing possibly 3 or 4 compounds. Infrared analysis of this reaction mixture showed two types of nitrile bands. When this sulfide mixture was oxidized, there was recovered therefrom a 30% yield of a sulfone M.P. 92–93° C. This sulfone was later proved to be 3-(p-chlorophenylsulfonyl)-2-chloropropionitrile, by comparison by mixed melting point with the sulfone made by the method of Example 1, above. When forcing conditions in the oxidation were attempted, dehydrohalogenation of the sulfone occurred and up to almost 20% yield of a chlorophenylsulfonylacrylonitrile was obtained. As a result of these experiments, it is concluded that the reaction mixture of acrylonitrile with p-chlorobenzenesulfenylchloride consists of a mixture of primarily 2-(p-chlorophenylthio)-3-chloropropionitrile and 3-(p-chlorophenylthio)-2-chloropropionitrile together with 3- and/or 2-(p-chlorophenylthio)acrylonitrile. This method of producing specific sulfides is not particularly desirable, except when attempting to produce the β-(chlorophenylthio)-isomer which, as indicated above, was recovered as a sulfone in 30% yield. If a mixture of sulfides for oxidation to sulfones was desirable, then this method would also be satisfactory.

Still another method of preparing the sulfides which are also new compounds is illustrated by an alternate preparation of 3-(4-chlorophenylthio)-2-chloropropionitrile. A sample of sodium 4-chlorothiophenate prepared by the addition of aqueous concentrated sodium hydroxide to 4-chlorothiophenol was gradually added with vigorous stirring to an equal mole amount of 2,3-dichloropropionitrile in water. The product was recovered by conventional means and was shown to be 3-(4-chlorophenylthio)-2-chloropropionitrile by elemental analysis, and infrared analysis. The structure was confirmed by oxidation of the product to same sulfone as obtained in Example 1.

EXAMPLE 6

This example describes the preparation of a mixture of 3-(tolylsulfonyl)-2-chloropropionitriles and 3-(xylysulfonyl)-2-chloropropionitriles.

In a one liter flask was placed 138 grams (1.0 mol based on a xylenethiol) of a mixture of toluenethiols and xylenethiols having a boiling range of 85°–134.5° C./50 mm. of Hg. With cooling and stirring to keep the flask contents below 40° C., 40 grams (1.0 mol) of sodium hydroxide in 400 ml. of water was added to the flask. The flask contents were cooled to 25° C., and over a period of 1 hour 123.9 grams (1.0 mol) of 2,3-dichloropropionitrile was added to the flask with cooling to remove the exothermic heat of reaction and keep the flask contents at a temperature between 25° and 30° C. After the dichloropropionitrile had all been added to the flask, stirring was continued for 1 additional hour at room temperature. The reaction mixture was extracted with ether, the ether layer washed once with water, dried over sodium sulfate and the ether distilled off under vacuum. The residual product was an orange oil weighing 205 grams, $n_D^{25}$ 1.5706. This intermediate product was a mixture of 3-(toluenethio)-2-chloropropionitriles and 3-(xylenethio)-2-chloropropionitriles. The theoretical yield based on a molecular weight of 138 for a xylene thiol was 226 grams. On this basis the yield from the reaction was 91%.

A 90.5 gram portion of this intermediate product was added to a one liter flask and also 400 ml. of glacial acetic acid. The flask and contents was heated to 35° C. and hydrogen peroxide addition was begun. Initially 35 ml. of hydrogen peroxide was added and the temperature of the reactants rose to 55° C., then subsided. A total of 135 ml. of 30% aqueous hydrogen peroxide (containing 1.2 moles of $H_2O_2$) was added to the flask keeping the temperature in the range of 45°–70° C. After the hydrogen peroxide had all been added, the flask and contents were heated to 55°–60° C. for one hour. At the end of this hour the reaction mixture was poured into three liters of ice water. A viscous yellow oil crude product separated from the water layer. The aqueous mixture was extracted two times with chloroform giving a yellow solution. The chloroform was removed from the chloroform layer by heating on a steam bath, the last traces of chloroform being removed first by water aspirator vacuum and then later at a vacuum of 0.5 mm. of Hg over a period of two hours. The residual product, a mixture of 3-(toluenesulfonyl)-2-chloropropionitrile and 3-(xylenesulfonyl)-2-chloropropionitrile isomers was a viscous oil, greenish-amber in color, $n_D^{25}$ 1.5380.

The sulfone product of this example in biological testing showed insecticidal activity on the yellow fever mosquito larvae at a concentration as low as 0.001%. Contact herbicidal activity was shown for this sulfone at a concentration as low as 0.2%.

EXAMPLE 7

This example illustrates the preparation of 3-(4-toluenesulfonyl)-2-chloropropionitrile.

To a one-liter flask was added 27.8 grams (0.695 mol) of sodium hydroxide in 400 ml. of water and 100 grams (0.8 mol of 4-toluenethiol). With cooling and stirring to keep the temperature of the reactants below 30°–35° C., 86 grams (0.695 mol) of 2,3-dichloropropionitrile was added. After stirring the mixture for about 3 hours a yellowish oily layer separated out. The reaction mixture was allowed to stand overnight. The next day the reaction mixture was extracted with ether and the ether layer washed once with water, dried over sodium sulfate and distilled, first removing the ether solvent, then collecting:

(I) B.P. 46°–47° C./1.5 mm., 22.5 grams of excess toluenethiol.
(II) B.P. 141°–144° C./1.2 mm., 23.5 grams, $n_D^{25}$ 1.5668 fairly pure product slightly contaminated with toluenethiol.
(III) B.P. 141°–144° C./1.2 mm., 104.1 grams, $n_D^{25}$ 1.5680 product.

Residue 19 grams.

Conversion was 86.7% based on 0.695 mol of the 2,3-dichloropropionitrile. An elemental analysis of the product yielded the following information:

| | Found | Calcd. for $C_{10}H_{10}ClNS$ |
|---|---|---|
| Percent: | | |
| C | 57.5 | 56.8 |
| H | 4.8 | 4.8 |
| N | 6.8 | 6.6 |
| Cl | 14.1 | 16.8 |
| S | 15.7 | 15.2 |

This intermediate product is 3-(4-toluenethio)-2-chloropropionitrile.

In a one liter flask was placed 84.6 grams (0.4 mol) of the 3-(4-toluenethio)-2-chloropropionitrile intermediate product and 400 ml. of glacial acetic acid. Then the addition was begun of 135 grams of 30% aqueous hydrogen peroxide (containing 1.2 mols of $H_2O_2$). The flask contents were then warmed to 50° C. and exothermic heat of the reaction carried the temperature to 65° C. By this time 40 ml. of peroxide had been added. After the reaction subsided an additional 20 ml. of peroxide was added, the flask and contents were again warmed, and then added an additional 20 ml. of hydrogen peroxide allowing the temperature to rise to 75° C. before the reaction subsided. The remaining 40 ml. of hydrogen peroxide was then added slowly and the temperature did not rise above 55° C. The temperature of the reactants was kept for one hour at 55° C., then the reactants were gradually warmed to 95° C. over a period of one hour. Then the reactants were poured into three liters of ice water. A solid white crystalline product formed and was separated by filtration. The crude product weighed 97 grams giving substantially a quantitative yield of 3-(4-toluenesulfonyl)-2-chloropropionitrile. The crude product was recrystallized from ethanol to give a crystalline white product having a melting point of 82°–83° C. An elemental analysis of the purified product was as follows:

| | Found | Calcd. for $C_{10}H_{10}ClNO_2S$ |
|---|---|---|
| Percent: | | |
| C | 48.9 | 49.3 |
| H | 4.6 | 4.1 |
| Cl | 14.1 | 14.6 |
| N | 5.4 | 5.8 |
| S | 13.2 | 13.1 |

The sulfone of Example 7 has been demonstrated to have insecticidal activity against the yellow fever larvae at a concentration as low as 0.001% of the sulfone. Contact herbicidal activity has been demonstrated for this sulfone at a concentration as low as 0.2%.

EXAMPLE 8

This example illustrates the preparation of 3-phenylsulfonyl-2-chloropropionitrile.

To a five liter flask was charged 280 grams (7 mols) of sodium hydroxide in 1500 ml. of water. The flask and contents were cooled to 25° C. and over a period of about 10 minutes 770 grams (7.0 mols.) of thiophenol was added. During the thiophenol addition agitation and cooling was used to keep the temperature of the reactants below 30% C. Then over a period of about 45 minutes keeping the temperature between 25° and 30° C., 867 grams (7.0 mols.) of 2,3-dichloropropionitrile was added. A yellow oil separated and was drawn off. The oil was dried under water pump vacuum at 50°–60° C. for 4 hours. The crude product was a yellow liquid with a slight amount of white curd precipitant therein. The desired liquid product was decanted from the precipitant and the liquid product weighed 1378 grams. Theoretical yield of the 3-phenylthio-2-chloropropionitrile intermediate product was 1379 grams.

A sample of 19.7 grams (0.1 mol.) of 3-phenylthio-2-propionitrile made in a manner similar to that described above was placed in a beaker and dissolved in 100 ml. glacial acetic acid. The beaker was warmed on a steam bath and over a period of 30 minutes 34 ml. of aqueous 30% hydrogen peroxide (containing 0.3 mol. of $H_2O_2$) was added. The temperature was maintained at 60°–80° C. during the hydrogen peroxide addition and the reactants were warmed for a ½ hour additional period. The reactants were then poured over ice and allowed to stand overnight. In the morning the crude solid product was separated by filtration and dried. The crude product weighed 23 grams, a quantitative yield. The crude product was recrystallized from ethanol to give 14.2 grams of white tiny plate crystals, M.P. 105–106°. This is the desired 3-phenylsulfonyl-2-chloropropionitrile product. An elemental analysis of this product gave the following information:

| | Found | Calcd. for $C_9H_8ClNO_2S$ |
|---|---|---|
| Percent: | | |
| C | 46.9 | 47.1 |
| H | 3.5 | 3.5 |
| Cl | 15.3 | 15.5 |
| N | 5.8 | 6.1 |
| S | 14.2 | 13.9 |

The sulfone product of Example 8 has shown insecticidal activity in tests on yellow fever mosquito larvae at a concentration of the sulfone as low as 0.001%, and contact herbicidal activity has been demonstrated for the sulfone at a concentration as low as 0.05%.

EXAMPLE 9

This example describes the preparation of a mixture of 3-(toluenesulfonyl)-2-chloropropionitrile isomers.

In a one liter flask was placed 124 grams (1 mol.) of a mixture of thiocresol isomers predominately meta. To this flask was then added 40 grams (1.0 mol.) of sodium hydroxide in 400 ml. of water with cooling and stirring to keep the temperature down. To the stirred solution in the flask was gradually added 123.7 grams (1.0 mol.) of 2,3-dichloropropionitrile over a period of about ½ to ¾ hour using external cooling to keep the temperature below about 40° C. The reaction mixture was stirred for two additional hours after which time the reaction mixture was extracted with ether. The ether layer was washed with water and then dried. After the drying step the ether was removed under reduced pressure. The resulting residual product was a red liquid, $n_D^{25}$ 1.5702, weight 199 grams. This represents a 94% yield of 3-(toluenethio)-2-chloropropionitrile isomers intermediate product.

A sample of 84.5 grams (0.4 mol.) of the intermediate product described in the paragraph above was placed in a one liter flask and diluted with 400 ml. glacial acetic acid. Then 35 ml. of aqueous 30% hydrogen peroxide was added to the flask at room temperature causing an exothermic reaction and a temperature rise to 38°–39° C. before the reaction subsided. An additional 35 ml. of hydrogen peroxide was added causing only a slight temperature rise. Then 20 ml. and 45 ml. quantities of hydrogen peroxide were added for a total of 135 ml. of added hydrogen peroxide. The reactants were stirred for an additional 5 hours at 25°–30° C. and allowed to stand at room temperature over the week-end. The next Monday, the flask contents were poured into 1.5 liters of ice and water, and a very viscous light yellow oil separated. The mixture was extracted with ether, the ether layer was washed once with water, and then the ether evaporated from the ether layer. The residual crude product was heated under water aspirator vacuum to remove small remaining amounts of ether, water and acetic acid. The residual product remaining was a light yellow viscous oil weighing 86.3 grams representing an 88.5% yield of the desired mixed 3-(tolylsulfonyl)-2-chloropropionitrile isomers.

The sulfone product of Example 9 has shown contact herbicidal activity at concentrations of the sulfone as low as 0.2%, and preemergent herbicidal activity at applications as low as 25 lbs./acre. In insecticidal testing on yellow fever mosquito larvae activity has been demonstrated at concentrations as low as 0.001%. This sulfone of Example 9 which is a mixture of 3-(tolylsulfonyl)-2-chloropropionitrile isomers is especially active as a microbiological toxicant. In testing this sulfone mixture as a paint preservative activity was demonstrated against mixed inocula at concentrations as low as 0.02%. In soap bacteriostatic testing activity has been demonstrated for the sulfone on the bacteria *Micrococcus pyogenes* var. *aureus* at a concentration as low as 10 p.p.m., *Salmonella typhosa* at 20 p.p.m. and *Pseudononas aeruginosa* at a concentration as low as 100 p.p.m.

EXAMPLE 10

This example illustrates the testing of some of the compounds of the invention as soil fungicides. In this test method naturally-infested soil fortified with fungi that incite root rots, stem cankers, seedling blights, and seed decay, is treated with a test chemical and incubated in a sealed container for a period of 24 hours. Seeds are sown in the treated soil which is then incubated at 70° F. for 48 hours before being removed to greenhouse benches. Disease assessments are made two weeks later.

A uniform supply of infested soil containing the following organisms is prepared:

> Rhizoctonia solani
> Fusarium oxysporum f. vasinfectum
> Sclerotium rolfsii
> Verticillium albo-atrum
> Pythium ultimum A 6 milliter aliquot of a 1% stock solution of a test chemical is pipeted into a mason jar containing 600 grams of infested soil. This initial application rate is 100 p.p.m. or approximately 200 lbs. per 6-inch acre. The jar is sealed and the contents are thoroughly mixed by vigorous shaking. The treated soil is incubated at 25° C. for 24 hours and is transferred to 4-inch azalia pots. Fifteen cotton and cucumber seeds are sown in each pot. The seeded pots are then incubated at 70° F. and at a high relative humidity (96-98%) to insure activity of the organisms in the soil. Forty-eight hours later the pots are removed to the greenhouse where disease assessments are made two weeks later.

Vapam (sodium methyl dithiocarbamate), and Captan-Zineb [N - (trichloromethylthio)-4-cyclohexene-1,2-dicarboximide+zinc ethylenebis (dithiocarbamate)] which are commercially used soil fungicides are included in the test as reference compounds.

In evaluating the tests the number of seedlings emerged and the number remaining healthy are recorded. The percent emergence and disease incidence is based on the inoculated, untreated, and the sterile soil treatments. The following rate scale is used:

Rating: Number of healthy Plants/30
- E—Excellent _____ 26–30.
- P—Promising _____ 19–25.
- F—Fair _____ 11–18.
- N—No good _____ 10 or less.

In the evaluation host specificity, injury to shoots and roots, as well as other abnormalities are noted.

Initially screening begins at the 100 and 30 p.p.m. levels. Those chemicals exhibiting activity (P and E) at 30 p.p.m. are retested in secondary testing at 30, 15 and 5 p.p.m. levels and the promising compounds are finally tested at 5, 2.5, and 1 p.p.m. concentrations.

In Table 1 below results of testing a number of the compounds of the invention as soil fungicides is reported.

Table 1

| Product of Example No. | Compound Name | Soil Fungicidal Rating [1] |
| --- | --- | --- |
| 6 | Mixed 3-(tolylsulfonyl)-2-chloropropionitrile and 3-(xylenesulfonyl)-2-chloropropionitrile isomers. | $P_{100}$, $P_{50}$, $F_{25}$. |
| 7 | 3-(4-tolylsulfonyl)-2-chloropropionitrile. | $P_{25}$, $P_5$, $P_{2.5}$, $N_{1.0}$. |
| 8 | 3-phenylsulfonyl-2-chloropropionitrile. | $P_{25}$, $P_5$, $P_{2.5}$, $N_{1.0}$. |
| 9 | Mixed 3-(tolylsulfonyl)-2-chloropropionitrile isomers. | $P_{25}$, $P_5$, $P_{2.5}$, $N_{1.0}$. |

[1] Subscript indicates chemical concentration in parts per million (p.p.m.). E=Excellent; P=Promising; F=Fair; N=No good.

It will be seen from examination of Table 1 that these compounds are extremely active soil fungicides. The data of Table 1 was obtained by the method of Example 10.

In Table 2 below additional soil fungicidal data is reported on three of the compounds of Table 1 compared with two commercially used soil fungicides. It will be seen from an examination of the data of Table 2 that all three of the compounds of the invention are appreciably more active than the commercial soil fungicides. The chemical structure of the two commercial soil fungicides is described hereinabove in detail.

Table 2

| Product of Example No. | Concentration, p.p.m. | Soil Fungicidal Activity | | | |
| --- | --- | --- | --- | --- | --- |
| | | Cotton | | Cucumber | |
| | | Percent Emerged | Percent Healthy | Percent Emerged | Percent Healthy |
| 7 | 5 | 73 | 60 | 76 | 73 |
| | 2.5 | 60 | 53 | 87 | 87 |
| | 1.0 | 47 | 13 | 77 | 33 |
| 8 | 5 | 77 | 70 | 94 | 94 |
| | 2.5 | 63 | 60 | 80 | 80 |
| | 1.0 | 57 | 23 | 67 | 30 |
| 9 | 5 | 70 | 70 | 80 | 77 |
| | 2.5 | 70 | 63 | 83 | 83 |
| | 1.0 | 77 | 53 | 60 | 47 |
| Vapam | 15 | 73 | 73 | 83 | 80 |
| | 7.5 | 90 | 90 | 83 | 83 |
| | 3.8 | 70 | 10 | 74 | 10 |
| | 1.0 | 23 | 3 | 17 | 3 |
| Captan+Zineb (1:1) | 200 | 30 | 23 | 23 | 23 |
| | 100 | 17 | 0 | 13 | 0 |

The percentages of Table 2 above are based on the number of seedlings emerged out of 30 total seeds planted. Sterile soil usually gives 87–94% emergence and 87–94% healthy. Untreated soil usually gives 0–17% emergence and 0% healthy. Thus, it is seen that the compounds of the invention are extremely active soil fungicides.

EXAMPLE 11

A number of compounds of the invention were tested in bacteriostatic and fungistatic methods. These compounds were mixed in predetermined concentrations with hot, sterile agar which was subsequently poured into Petri dishes, cooled, and allowed to harden. Nutrient agar containing the test compounds was then inoculated with the bacteria *Micrococcus pyogenes* var. *aureus* and *Salmonella typhosa*, and Sabouraud's dextrose agar containing the test compounds was inoculated with the fungus organism *Aspergillus niger*. The bacteria were incubated for 2 days at 37° C., the fungi at 25° C. for 5 days.

The results of these bacteriostatic and fungistatic tests are reported in Table 3 below.

Table 3

| Toxicant, Product of Example No. | Organism [1] | Minimum Toxicant Concentration to Inhibit Organism Growth, p.p.m. |
| --- | --- | --- |
| 1 | 1 | 100 |
| | 2 | 10 |
| | 3 | 10 |
| 6 | 1 | 100 |
| | 2 | 100 |
| | 3 | 10 |
| 7 | 1 | 100 |
| | 2 | 100 |
| | 3 | 10 |
| 8 | 1 | 100 |
| | 2 | 100 |
| | 3 | 100 |
| 9 | 1 | 10 |
| | 2 | 10 |
| | 3 | 10 |

[1] The bacteria organisms were: 1, *Micrococcus pyogenes* var. *aureus*, and 2, *Salmonella typhosa*, and the fungus organism was 3, *Aspergillus niger*.

Thus, it is seen that the compounds of the invention are potent bacteriostats and fungistats. Usually these novel compounds will be applied as bacteriostats and/or fungistats at concentrations in the range of 0.0001% to 1.0%, preferably 0.001% to 0.1%, suspended, dispersed or dissolved in an inert carrier. Suitable compounding of the compounds of the invention is discussed in detail hereinbelow.

The present microbiological toxicant products are particularly useful for the prevention and control of bacterial infections and of decomposition and decay caused by mildew, molds, and other non-chlorophyll containing plants. Thus, e.g. the present products can be used for the protection of organic materials subject to deterioration by rotting, such as leather, fur, pulp, paper, textiles, rope, rubber, latex, plastics, and paint. Incorporation of protective fungistats in such organic materials is especially desirable when they are exposed to conditions favoring microbiological growth. Thus, e.g. the present microbiological toxicants can be used to protect wood buried in ground as in the case of railroad ties and telephone poles; textiles exposed to damp, as under tropical conditions, or in the case of lawn furniture, awnings, etc.; or they can be used in marine paints and lacquers subject to algal and fungal attack, etc. The present products can also be used as seed protectants and soil sterilants for the suppression of organisms harmful to seeds and plants. Additionally the present microbiological toxicants which are active against sulfate-reducing bacteria, can be added to oil field injection flood waters for the prevention of pipe plugging caused by hydrogen sulfide-releasing bacteria such as *Desulfavibrio desulfuricans*.

The microbiological toxicants of this invention also have a high degree of germicidal activity, and compositions containing these products are good disinfectants. Disinfectant compositions containing the present products can be used for disinfection or sterilization of surgical instruments, dairy equipment, eating utensils, and other articles requiring such treatment, or in sanitary solutions to wash walls, floors, etc. When employed in the manufacture of pharmaceutical, cosmetical edible compositions, the present microbiological toxicants can have both preservative and antiseptic effects.

The sulfone products of the invention can be applied directly to the material to be treated, e.g., by incorporation of the bacteriostatic and fungistatic sulfone in a disinfectant soap or antiseptic cream. However, because the present products are effective in extremely dilute concentrations for most applications, it is preferred to incorporate them in a carrier or diluent. The choice of diluent is determined by the use of the composition as is the concentration of the active ingredient in the diluent. Thus, by admixture with an inert pulverulent carrier such as talc, bentonite, kieselguhr, diatomaceous earth, etc., there can be prepared compositions suitable for admixture with seeds, etc., to afford protection from microbiological attack in the soil. Solutions in compounds in organic solvents such as kerosene can be applied as a spray or impregnating bath, if desired, with the use of pressure to facilitate penetration of the solution for treatment of cellulosic materials to products, e.g., rot-proofing. Suitable formulations and application of the present sulfone products to articles subject to microbiological attack are also prepared by mixing the sulfone with an emulsifying agent suitably in the presence of organic solvents and then diluting with water to form an aqueous emulsion containing the sulfone. Suitable emulsifying agents include, e.g. alkylbenzenesulfonates, polyalkylene glycols, salts of sulfated long-chain alcohols, sorbitan fatty acid esters, etc.; other emulsifying agents which can be used to formulate emulsions of the present compounds are listed, e.g., in U.S. Department of Agriculture Bulletin E607. Aqueous emulsions of the microbiological toxicant products of the invention are also particularly suited for use as disinfectant solutions, e.g., to wash floors and walls, or to rinse restaurant ware, etc. In another embodiment of this invention, standard paint formulations can be used as diluent or carrier for the microbiological toxicant compounds of the invention; the sulfone products can assist in preventing mold growth, e.g., casein paints and the paints can also be applied to surfaces which are thereby rendered resistant to the growth of lower organisms. The microbiological toxicants can be admixed with carriers which are active of themselves, for example, with hormones, with buffering and/or softening agents, etc. As soil fungicides, normally it will be preferred to apply the compounds of the invention diluted with a carrier or diluent similar to that described above for other microbiological uses, although it is conceivable in some instances it might be desirable to apply the inventive sulfones without dilution or by dilution only with air during spraying.

In commercial use these soil fungicides of the invention would be applied to the soil in concentrations in the range of about 2 to about 200 lbs./acre, preferably in the range of about 5 to about 100 lbs./acre, depending on the activity of the particular compound used, the nature of the soil, how badly the soil was infected with fungi, the particular types of fungi to be suppressed or destroyed, etc. The soil fungicides could be applied to the soil in dilute concentration as described above and mixed into the soil by plowing, disking, harrowing, or other type of cultivation, or at the time of seeding. Application of the chemical to the soil could be prior to or concurrently with the cultivating or seeding operations by apparatus well known and commercially available for this type of treatment. Alternatively the soil could be treated by planting seeds treated with the chemical, but the direct soil treatment rather than seed treatment would appear to be more effective.

Although the invention has been described in terms of specified embodiments which are set forth in considerable detail, it should be understood that this is by way of illustration only, and that the invention is not necessarily limited thereto, since alternative embodiments will become apparent to those skilled in the art in view of the disclosure. Accordingly, modifications are contemplated which can be made without departing from the spirit of the described invention or of the scope of the appended claims.

What is claimed is:

1. An arylsulfonyl haloalkanenitrile of the formula

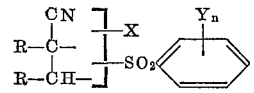

wherein R is selected from the class consisting of hydrogen, the phenyl radical, and alkyl and cycloalkyl radicals containing from 1 to 6 carbon atoms, provided at least one R is hydrogen, X represents a halogen atom selected from the class consisting of chlorine and bromine, Y is selected from the class consisting of chlorine, bromine, iodine, fluorine, hydrogen and alkyl radicals having from 1 to 6 carbon atoms, and $n$ is an integer from 1 to 5.

2. A haloalkanenitrile of claim 1 wherein one R is the methyl radical, X is chlorine and Y is bromine.

3. A haloalkanenitrile of claim 1 wherein Y is chlorine, R is hydrogen and X is chlorine.

4. A haloalkanenitrile of claim 1 wherein Y is $CH_3$, R is hydrogen and X is chlorine.

5. 3-phenylsulfonyl-2-chloropropionitrile.

6. An arylsulfonylhaloalkanenitrile of the formula

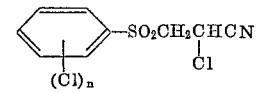

wherein $n$ is an integer from 1 to 5.

7. 3-(4-chlorophenylsulfonyl)-2-chloropropionitrile.

8. An arylsulfonyl haloalkanenitrile of the formula

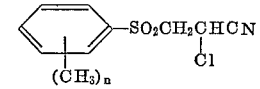

wherein $n$ is an integer from 1 to 2.

9. 3-(4-tolylsulfonyl)-2-chloropropionitrile.
10. 3-(tolylsulfonyl)-2-chloropropionitrile.

(References on following page)

References Cited in the file of this patent

UNITED STATES PATENTS

| | | |
|---|---|---|
| 2,435,552 | Bruson | Feb. 3, 1948 |
| 2,485,095 | Harris et al. | Oct. 18, 1949 |
| 2,743,210 | Jones et al. | Apr. 24, 1956 |
| 2,748,164 | Dodson | May 29, 1956 |
| 2,788,360 | Westfahl | Apr. 9, 1957 |

FOREIGN PATENTS

| | | |
|---|---|---|
| 191,447 | Switzerland | June 15, 1937 |
| 713,811 | Germany | Nov. 15, 1941 |